(12) United States Patent
Kavantzas

(10) Patent No.: US 6,895,408 B1
(45) Date of Patent: May 17, 2005

(54) METHOD AND APPARATUS TO FACILITATE INTERACTION MANAGEMENT BETWEEN LOOSELY COUPLED APPLICATIONS

(75) Inventor: Nickolaos Kavantzas, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 605 days.

(21) Appl. No.: 10/102,320

(22) Filed: Mar. 19, 2002

(51) Int. Cl.7 .............................................. G06F 17/30
(52) U.S. Cl. .................... 707/104.1; 707/6; 707/100; 717/100; 717/101
(58) Field of Search ...................... 707/6, 100, 104.1, 707/9; 713/164, 166; 717/100, 101, 102, 103, 127

(56) References Cited

U.S. PATENT DOCUMENTS

| | | | | |
|---|---|---|---|---|
| 5,701,482 A | * | 12/1997 | Harrison et al. | 718/105 |
| 5,862,377 A | * | 1/1999 | Lee | 719/329 |
| 6,401,111 B1 | * | 6/2002 | Dan et al. | 709/204 |
| 6,618,764 B1 | * | 9/2003 | Shteyn | 709/249 |
| 6,647,443 B1 | * | 11/2003 | Schultz et al. | 710/52 |
| 6,665,685 B1 | * | 12/2003 | Bialic | 707/102 |
| 6,728,698 B2 | * | 4/2004 | Yen et al. | 707/2 |
| 6,772,216 B1 | * | 8/2004 | Ankireddipally et al. | 709/230 |

* cited by examiner

Primary Examiner—Greta Robinson
Assistant Examiner—Cheryl Lewis
(74) Attorney, Agent, or Firm—Park Vaughan & Fleming LLP; Edward J. Grundler (57) ABSTRACT

One embodiment of the present invention provides a system that facilitates interaction management between loosely coupled applications. The system operates by first receiving one or more Data Tokens at a Databus. A Databus is a computing process, which provides persistent storage, computation services, and scheduling services. The system stores these Data Tokens in a matching queue within the Databus. Next, the system creates a Data Token entry within data tables, which specify the Data Tokens stored in the matching queue. A matching process matches the Data Token with registered Reactions in the Reaction matching tables. These Reactions specify the persistent query or exclusive interest of Data Tokens required for performing a service. When all Data Tokens required for the service are available, the system places a scheduling entry in a scheduling queue to schedule the execution of the matched Reaction that provide the requested service.

25 Claims, 7 Drawing Sheets

METHOD AND APPARATUS TO FACILITATE INTERACTION MANAGEMENT BETWEEN LOOSELY COUPLED APPLICATIONS

BACKGROUND

1. Field of the Invention

The present invention relates to applications within computing systems. More specifically, the present invention relates to a method and an apparatus to facilitate interaction management between loosely coupled applications.

2. Related Art

The future of business computing applications assumes the ability to perform interactions where computing applications are able to communicate with other computing applications over a long period of time, without limiting resources, and while surviving temporary system faults.

Each computing application, when communicating with another computing application, exists as a peer. As peers, a computing application may choose to ignore a request, or may choose to execute one or more functions on Either computing application can make requests to the other application but cannot require submission by the peer and cannot assume control of the resources owned by the peer.

Inter-peer communication can include request/response interaction between objects and one-way asynchronous information distribution. Request/response interactions can require long periods of time, possibly days, to complete and one-way asynchronous information distribution requires reliable delivery. Failures of these inter-peer communications, including temporary failures such as lost packets on a network, can lead to inconsistencies within the applications and to non-recoverable applications.

Long-running computing applications that block execution or lock resources for extended periods of time are detrimental to system performance and throughput. Additionally, each computing application may require knowledge of the interface to multiple peer computing applications. In some cases, adding new peer computing applications can require changes in existing applications.

What is needed is a method and an apparatus that facilitates interaction management between loosely coupled applications, which do not exhibit the problems described above.

SUMMARY

One embodiment of the present invention provides a system that facilitates interaction management between loosely coupled applications. The system operates by first pulling one or more Data Tokens from a Databus. These Data Tokens are pushed from a Reaction within a Process or from a client participant and represent a service request or a Process response or Process local information. Several Processes working together form an Interaction. A Databus is a computing process, which provides persistent storage, computation services, and scheduling services. The system stores these Data Tokens in a matching queue within the Databus. Next, the system creates a Data Token entry within a Data Token table, which specifies the name and context of the Data Token. A matching process matches these Data Token entries with registered Reactions in the appropriate matching context. When all Data Tokens required for a Reaction are available, the system places a scheduling entry in a scheduling queue to schedule the service execution.

In one embodiment of the present invention, the system receives a service request Data Token and stores it in the matching queue. Next, the system creates a Process entry in the process table, and a Reaction entry in the reaction table.

In one embodiment of the present invention, the system receives Data Tokens at the Databus and routes them to an additional Databus. Routing the Data Tokens to the additional Databus is transparent to a creator of the Data Tokens. The additional Databus provides the requested service.

In one embodiment of the present invention, the Databus retries the scheduling entry until either the service is provided or an exception is raised.

In one embodiment of the present invention, the Databus ensures that the service is provided exactly once.

In one embodiment of the present invention, the application is recoverable and restartable in case of system failures during processing.

In one embodiment of the present invention, the application tracks its Processes and their Interaction patterns. This tracking includes which Processes are started and completed, which Processes are pending, which Processes can push/pull Data Tokens to/from other Processes, and the sequencing of execution of defined Processes.

In one embodiment of the present invention, the system propagates security context and provides security credentials. Providing security credentials includes identity impersonation to receive the service.

In one embodiment of the present invention, interaction management includes lifecycle management of Process and Reaction computation context.

In one embodiment of the present invention, version management includes lifecycle management, persistent garbage collector, and data value versioning of Data Tokens.

In one embodiment of the present invention, deadlock prevention management includes exclusive access management of Data Tokens pulled from registered Reactions.

In one embodiment of the present invention, the system performs transactional data driven execution of application logic. Composite matching on available Data Tokens is based on specified rules, which describe under which conditions these Data Tokens can fire which application method.

DEFINITIONS

Interaction: An interaction is a unit of work that reflects the behavior of a business transaction. The interaction groups a series of data exchanges between Processes.

Process: A Process represents a business task. The Process encapsulates the units of work, Reactions, which perform the detailed work of the business task.

Reaction: A Reaction performs the detailed work of the business task. The Reaction is used to:
  push Data Tokens to and pull Data Tokens from the Databus,
  process service requests,
  request service from other active business logic units,
  return results to the caller Process,
  store information in the Databus,
  enforce business constraints that preserve the consistency of a business transaction, and
  provide application restartability, in case of failures.

Data Token: A Data Token encapsulates: a request for service, a response from a service request, an exception condition such as the expiration of a timer, a state variable of a Process or Interaction and any active information shared between the loosely-coupled applications that participate in an Interaction.

Databus: A Databus is the fundamental active component of the invention. Applications attach to the Databus to exchange data and request services. The Databus is responsible for routing and matching Data Tokens with registered Reactions, and enables transparent load balancing and execution of the attached applications.

EXAMPLE

Figure 7:
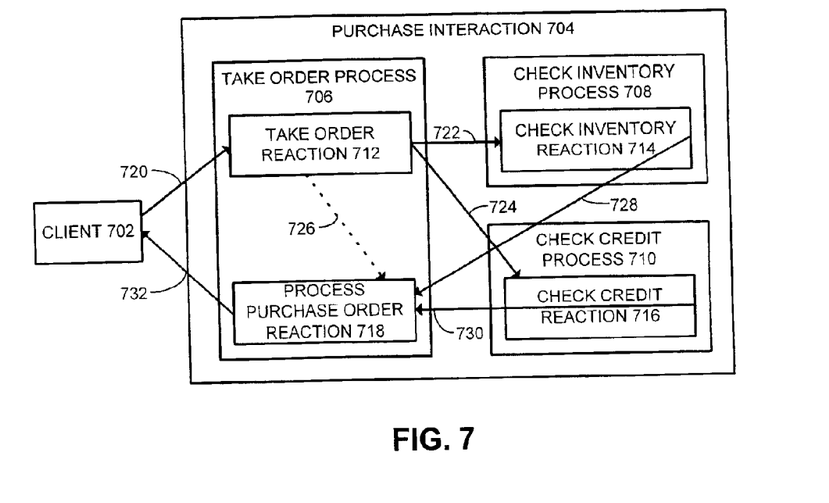
FIG. 7 illustrates an example purchase interaction including several Processes and Reactions in accordance with an embodiment of the present invention.

FIG. 7 illustrates an example purchase interaction including several Processes and Reactions in accordance with an embodiment of the present invention. Purchase Interaction 704 is a simplified purchase interaction, which includes only an inventory check and a credit check. A practitioner with ordinary skill in the art will be able to extend the example to include any other necessary Processes for creating a purchase interaction.

Purchase Interaction 704 includes several Processes, including take order Process 706, check inventory Process 708, and check credit Process 710. These Processes include several Reactions. Specifically, take order Process 706 includes take order base Reaction 712 and process purchase order Reaction 708; check inventory Process 708 includes check inventory base Reaction 714; and check credit Process 710 includes check credit base Reaction 716. The system starts when client participant 702 sends asynchronous request 720 to take order Reaction 712 initiating take order Process 706. Take order Reaction 712 executes and produces outputs 722, 724, and 726. Output 722 is a Reaction call to check inventory Reaction 714 in check inventory Process 708, output 724 is a Reaction call to check credit Reaction 716 in check credit Process 710, and output 726 registers process purchase order Reaction 718 within take order Process 706. Note that process purchase order Reaction 718 will not execute until the results of both check inventory Process 708 and check credit Process 710 are available.

When all necessary Data Tokens are available for check inventory Process 714, its' base Reaction executes and produces Data Token 728 indicating the results of the inventory check. Independent of the inventory check, when all necessary Data Tokens are available for check credit Reaction 716, this Reaction executes and produces Data Token 730 indicating the results of the credit check. Note that there are no restrictions on completion order for check inventory Process 708 and check credit Process 710. Check inventory Process 708 and check credit Process 710 may execute simultaneously or either Process can execute prior to the other Process executing.

When both Data Tokens 728 and 730 are available, process purchase order Reaction 718 executes producing output 732, thereby terminating purchase interaction 704. Note that this example does not include error-handling Processes. These Processes, however, only include additional Reactions and are an obvious extension to the described steps and will not be described further herein.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Systems

Figure 1:
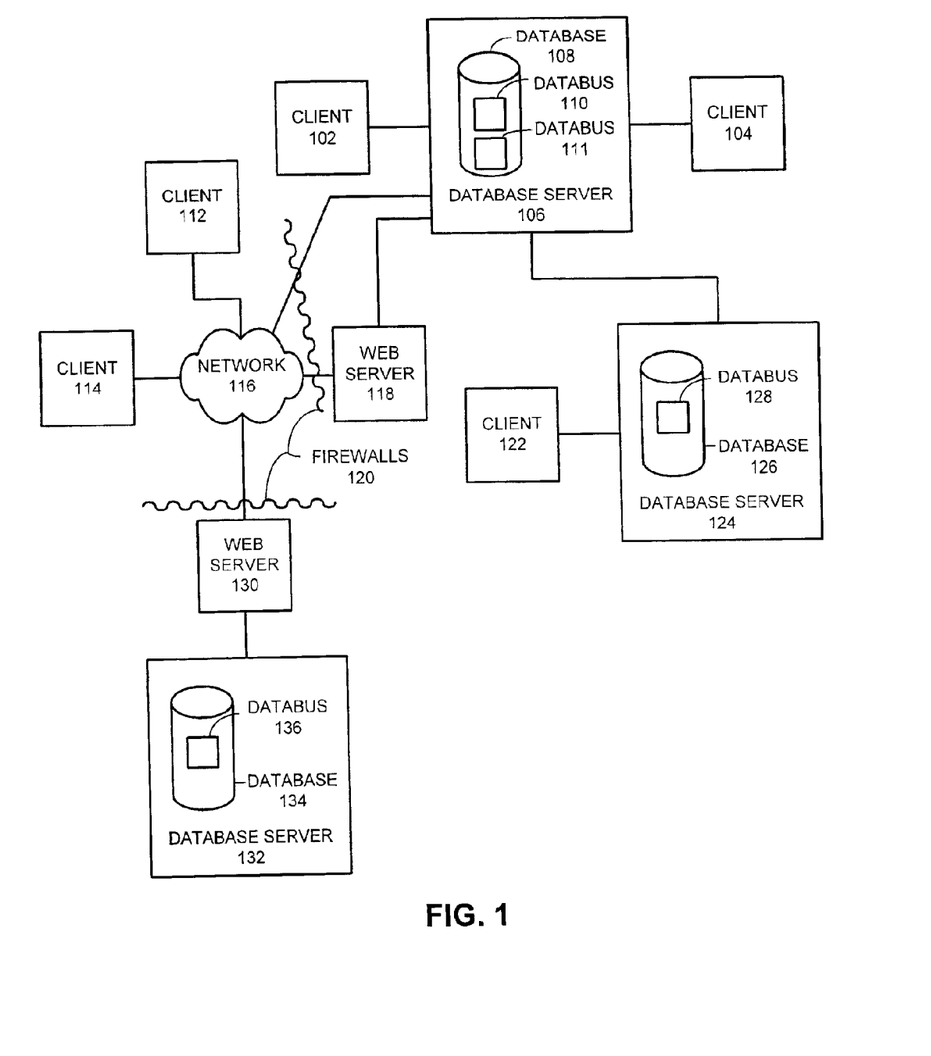
FIG. 1 illustrates computing systems coupled together in accordance with an embodiment of the present invention.

FIG. 1 illustrates computing systems coupled together in accordance with an embodiment of the present invention. Participants 102, 104, 112, 114, and 122 are computing systems, which execute applications on behalf of an enterprise. Database servers 106, 124, and 132 provide database services, including active Databuses, to participants 102, 104, 112, 114, and 122. Web servers 118 and 130 provide access control for participants accessing the database servers across network 116. Firewalls 120 prevent unauthorized access to web servers 118 and 130 and to database server 106 from network 116.

Participants 102, 104, 112, 114, and 122, database servers 106, 124, and 132, and web servers 118 and 130 can generally include any type of computer system, including, but not limited to, a computer system based on a microprocessor, a mainframe computer, a digital signal processor, a portable computing device, a personal organizer, a device controller, and a computational engine within an appliance.

Network 116 can generally include any type of wire or wireless communication channel capable of coupling together computing nodes. This includes, but is not limited to, a local area network, a wide area network, or a combination of networks. In one embodiment of the present invention, network 116 includes the Internet.

Database servers 106, 124, and 132 include databases 108, 126, and 134, respectively. Databases 108, 126, and 134 can include any type of system for storing data in non-volatile storage. This includes, but is not limited to, systems based upon magnetic, optical, and magneto-optical storage devices, as well as storage devices based on flash memory and/or battery-backed up memory. Database 108 includes Databuses 110 and 111, database 126 includes Databus 128, and database 134 includes Databus 136.

Figure 2:
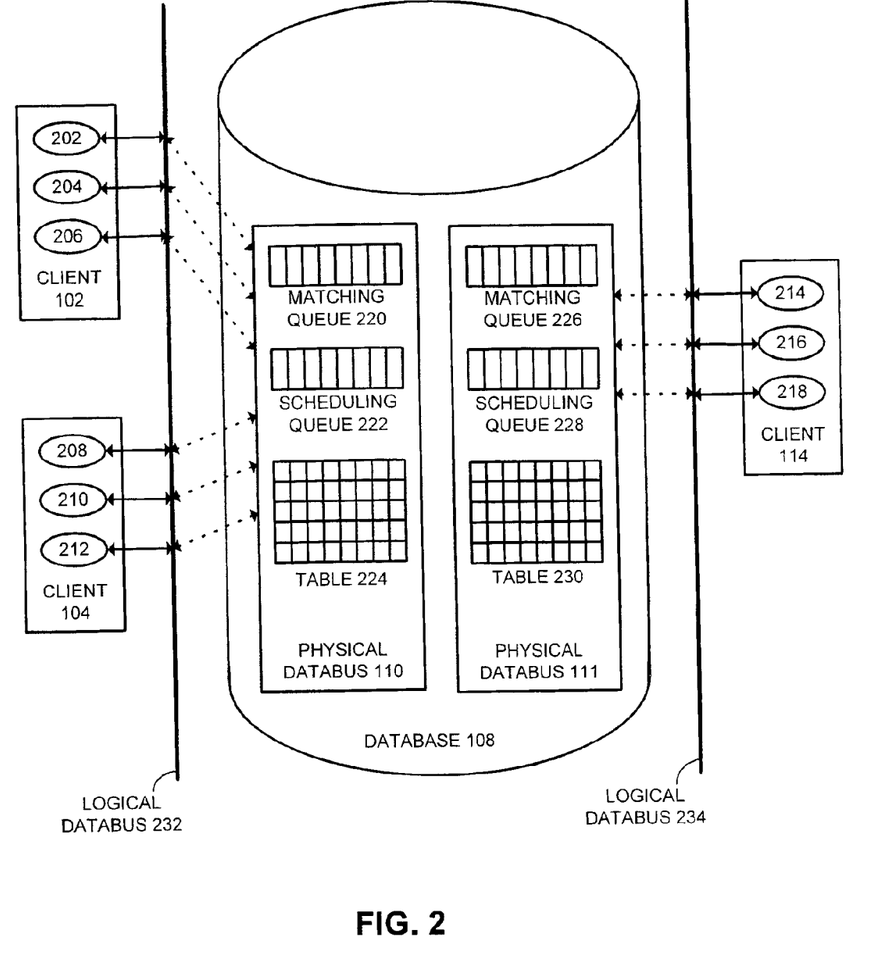
FIG. 2 illustrates participants interacting with Databuses in accordance with an embodiment of the present invention.

Databuses 110, 111, 128, and 136 will be discussed further in conjunction with FIG. 2 below.

Computing applications executing on participants 102, 104, 112, 114, and 122 can be peer applications, which communicate active data and computation results among each other. Additionally, participants 102, 104, 112, 114, and 122 can be individually unavailable at the time an application on one participant needs service from or needs to supply data to another application on a different participant.
Databuses are the Reactive Storage FIG. 2 illustrates participants interacting with Databuses in accordance with an embodiment of the present invention. Database 108 is typical of the databases within the system and will be described in detail. Other databases within the system operate in a substantially equivalent manner. Database 108 includes physical Databuses 110 and 111. Note that a database may include more or less Databuses than shown.

Participants 102 and 104 are coupled to logical Databus 232 while participant 114 is coupled to logical Databus 234. Logical Databuses 232 and 234 provide a consistent interface to applications executing on participants 102, 104, and 114.

Participant 102 includes scheduling elements 202, 204, and 206, participant 104 includes scheduling elements 208, 210, and 212, and participant 104 includes scheduling elements 214, 216, and 218. Note that these participants may include more or less scheduling elements than shown. Scheduling elements 202–218 push and pull Data Tokens according to instructions contained in the computing applications being processed. For example, scheduling element 202 can be pushing Data Tokens to logical Databus 232 while scheduling element 210 may be pulling Data Tokens provided by logical Databus 232. An individual scheduling element may be unaware of the destination-scheduling element of any Data Token it pushes, and the source-scheduling element of any Data Token it pulls. An individual scheduling element, after pulling all the matched Data Tokens, can push one or more Data Tokens that can be pulled by other scheduling elements.

Physical Databus 110 includes matching queue 220, scheduling queue 222, and table 224, while physical Databus 111 includes matching queue 226, scheduling queue 228, and table 230. Data tokens and data requests supplied to physical Databus 110 from logical Databus 232 or another physical Databus within the system are stored in matching queue 220. Physical Databus 110 then places an entry in table 224 and possibly other tables associated with matching queue 220 within physical Databus 110. Physical Databus 111 and other physical Databuses within the system operate in a similar manner. Note that Data Tokens received by physical Databus 110 can also be destined for a different Databus and will be forwarded by the queuing system to the appropriate physical Databus.

Tables 224 and 230 maintain information relative to various Interactions including Data Tokens, Process information, registered Reactions, and Reaction matching templates. Note that tables 224 and 230 may include multiple tables with an individual table for each different type of information. A Reaction is the mechanism that fires when all required input Data Tokens are available and may also create and then push output Data Tokens.

Reactions are the fundamental elements of Processes and perform the detailed work of the business task. A Process represents a business task that encapsulates the units of work, or Reactions, which perform the detailed work of the business task. Processes are the units within interactions, the units of work that reflects the behavior of a business transaction. The relationships among Interactions, Processes, and Reactions are explained in more detail in conjunction with FIG. 7 below.

Figure 3:
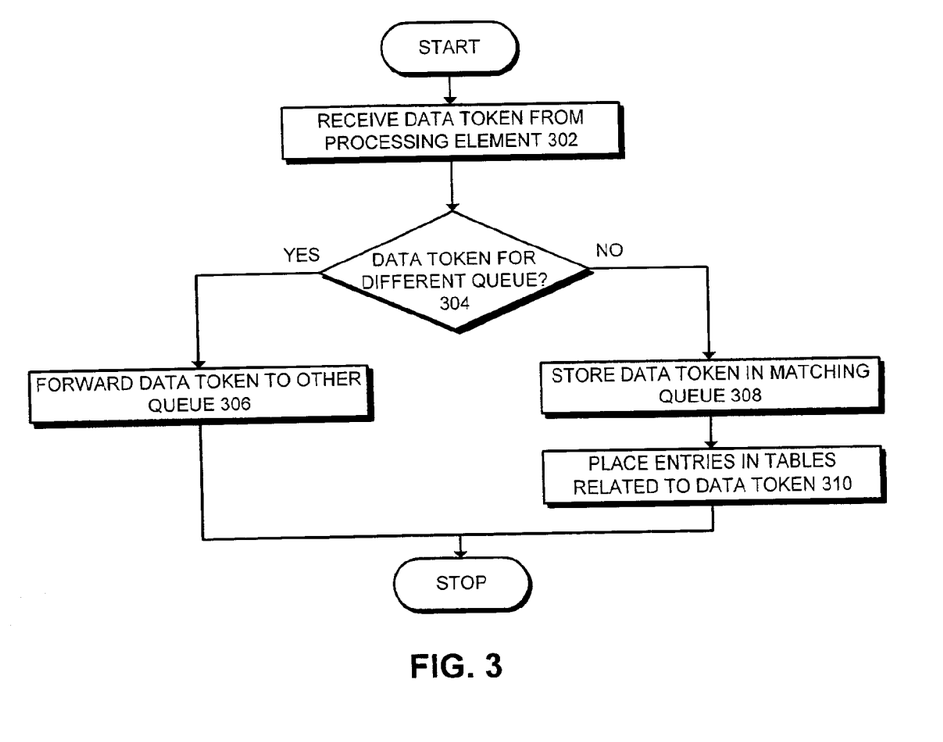
FIG. 3 is a flowchart illustrating the process of receiving a service request in accordance with an embodiment of the present invention.
Figure 4:
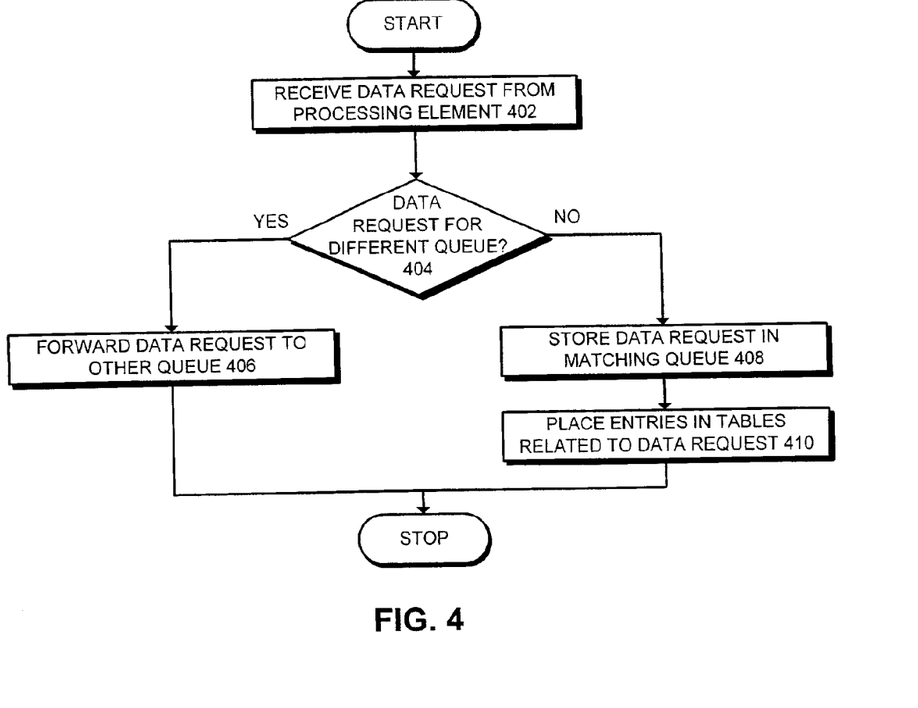
FIG. 4 is a flowchart illustrating the process of receiving a Data Token in accordance with an embodiment of the present invention.

Physical Databus 110 then examines table 224 to determine if there are any matches between the Data Tokens stored in Data Token table and the registered Reactions in the reaction table. If all Data Tokens are available for a registered Reaction, physical Databus 10 places an entry in scheduling queue 222 for a scheduling element, which then activates an application that can service the matched Reaction(s). The matching of the Data Tokens and reactions can result in zero or more reactions being matched.
Pulling Data Tokens FIG. 3 is a flowchart illustrating the process of pulling a Data Token in accordance with an embodiment of the present invention. The system starts when a physical Databus, for example physical Databus 110, receives a Data Token from a processing element associated with a client participant (step 302) or another Reaction. Next, physical Databus 110 determines if the Data Token is destined for a different Databus (step 304). If so, physical Databus 110 forwards the Data Token to the destination Databus (step 306).

If the Data Token is not destined for a different Databus, physical Databus 110 stores the Data Token in matching queue 220 (step 308). Finally, physical Databus makes an entry in table 224 relating to the Data Token (step 310). Note that entries may be made in more than one table. For example, a new Reaction may be registered within the registered Reactions portion of table 224.

Data Tokens represent the active information communicated between the loosely coupled applications. The activation of a Reaction is triggered by the availability of Data Tokens. Availability is defined by the arrival of one or more Data Tokens, with the right conditions, and the right access mode. When an application is requesting a service the Databus automatically pushes a request Data Token, which consists of:

a Process descriptor, which specifies the service that is requested (such as, takeOrder)

a request object of the service provider to whom the request is destined to     a response object, which contains the Process Context (Interaction and Process-Activation identifiers) instance of the requester     process that will later receive the     results from the service provider     business task input arguments, which are used by the service provider to honor the service When a Reaction returns result(s) or throws exception(s), a response Data Token is automatically pushed by the Databus, which consists of: a response object, which contains the Process Context (Interaction and Process-Activation identifiers) instance of the requester process business task returned results.

In the case where the caller of the returning Process is a Process then the Databus stores the response Data Token in the caller Process context. All existing registered Reactions or newly registered Reactions on that Process will be evaluated for matching with the response Data Token and with other Data Tokens which are already available in this Process, if a composite matching is required by a Reaction.

In the case where the caller of the returning Process is a client participant and not another Process then the Databus stores the response Data Token to a special Databus storage area from where the client participant can retrieve it.

The data types of the objects carried inside an in or out Data Token can be basic data types (such as int, string, float, boolean, etc.) or constructed object types.

Data Tokens follow the single-assignment rule by default. Only one declaration of a Data Token, in a specific matching context, is allowed by the Databus. Forcing multiple declarations of a Data Token is allowed by using special directives to the Databus, thus obtaining a non-deterministic assignment of the declared Data Token with the first object value that arrives to the Databus. Subsequent values will be ignored.

Data Token can be assigned object values multiple times by a Reaction that has registered exclusive access interest in this Data Token. All the object value modifications done by concurrently executing Reactions are observed as the modifications happened by serially executing Reactions.

Data Tokens may be part of a Data Token Stream. Then, for every declared Data Token of stream type, all object values that arrive in the Databus are available for Reaction matching.

Data Tokens values are versioned. When a new Data token is declared, it is assigned by the Databus version 0, with empty object value. When the first actual value is assigned to the previously declared Data Token, a new object value is created and it is assigned the version 1. Subsequently, every change of the Data Token object value, done by the Databus storeData operation, creates a new object value, marks this object value as the latest and increments the version number of the Data Token.

Figure 6:
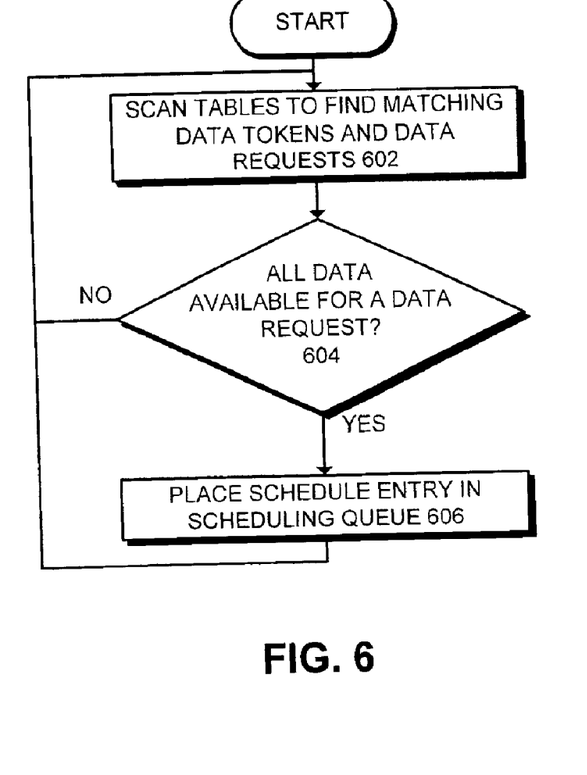
FIG. 6 is a flowchart illustrating the process of placing an entry in the scheduling queue in accordance with an embodiment of the present invention.

The Databus Data Token garbage collection process is responsible for making Data Tokens unavailable for matching if their time-to-live has expired and they are not currently matched by any Reaction. After an available Data Token becomes unavailable for matching it is retained in the Databus as long as its cleanup time-to-live has not expired.
Interactions Behave as Loosely Coupled Global Transactions The Interaction groups a series of business data exchanges by providing the global execution context of the business transaction. These applications may run in isolation and commit/rollback their own data without knowledge of other applications. However these applications should not be considered as different pieces, because the relationships formed amongst them must be coordinated and their consistency maintained. When a business transaction becomes inconsistent, its participating applications may need to recover. The application recovery can be obtained by registering compensating Reaction(s). For example, once the supplier has confirmed the purchase order request back to the buyer, the buyer needs to register a compensating Reaction that monitors additional responses from the supplier that may inform him that the purchase order cannot be fulfilled because the manufacturing department is running late. If the supplier's promise is cancelled, then the buyer's compensating reaction is matched and then fired to allow the buyer application to recover its application consistency. This reaction can pick a new supplier and request the item from him or abandon the purchase order process completely.
Processes Group Related Loosely Coupled Application Logic FIG. 6 illustrates Process 508 in accordance with an embodiment of the present invention. Process 508 includes Reaction(s). Each Process does the following:

Encapsulates the Reactions, which perform its detailed work.

Encapsulates Data Tokens. The business task's input parameters, and its responses and other active information shared between the Reactions that this Process encapsulates.

Maintains the data flow context that determines how to route the response to the caller business task.

Figure 5:
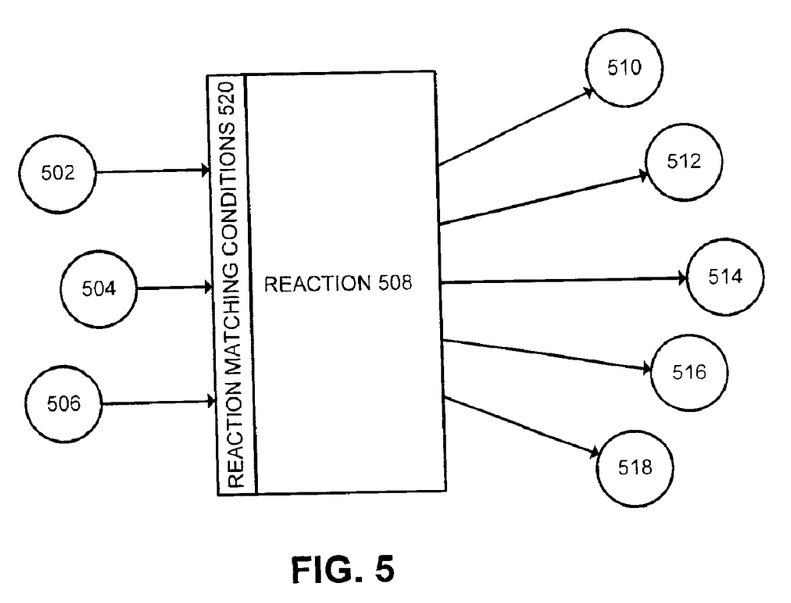
FIG. 5 illustrates an Interaction, Process, Reaction, and Data token relationship in accordance with an embodiment of the present invention.

FIG. 7 illustrates two Processes. A Process has a base Reaction that represents the service request. When the base Reaction matching conditions 520 are met, the base Reaction 508 executes and pushes output Data Tokens. As illustrated in FIG. 5, input Data Tokens 502, 504, and 506 are applied to Reaction 508. When Reaction matching conditions 520 determine that input Data Tokens 502, 504, and 506 are available Reaction 508 executes. Note that input Data Tokens 502, 504, and 506 can arrive independently and may arrive over a long period of time.
Reactions Describe the Active and Reactive Capabilities of an Application Using the Reaction construct, an application can describe its active and reactive capabilities.

A Reaction Pull captures a reactive capability of a participant, by describing its query or exclusive modification interest on the availability of a correlated collection of Data Tokens.

A Reaction Push captures an active capability of a participant, by describing its provisioning of Data Tokens to fulfill a query or exclusive modification interest.

Reaction Pushes/Pulls are complementary capabilities.

Reaction Pushes/Pulls describe the conditions and terms of when and how to match Data Tokens with Reactions, the policies of where and how to make them available after matched and finally when and which application services to invoke.

A Reaction pull is a combination of the following: A Reaction Matching Template, a set of rules designating when the Reaction will match, what Data Tokens, in what access modes (shared or exclusive modification) under what security, are required to be pulled before firing, and under what conditions the Reaction is allowed to fire. And an application method which is executed when the Reaction fires.

In every Process there is a base Reaction, which is implicitly created by the Databus when a Process is created as a result of the Databus request for service operation. Additionally an application can explicitly create a Reaction at run time using the Databus registerReaction operation to synchronize on availability of Data Tokens. The implicit or explicit registerReaction operation specifies the Reaction template and also the application method to be executed when matching succeeds.

Reactions can access/modify shared database objects. These objects can be traditional database objects, thus facilitating coarse grain information sharing in a transactional manner. Similarly, the Reactions exchange fine grain information such as application method input parameters, and return values, using the Databus.

The Reaction processes incoming requests, can return results based on the request, and enforces business constraints to preserve application consistency. When a Reaction is fired, it can consume one or more input data parameters, process them, and then possibly produce one or more output Data Tokens for other Reactions. FIG. 7 demonstrates how when all Data Tokens are available and the conditions are matched, the Reaction fires, which causes the method to execute. This method may return results, which are converted to Data Tokens by the Databus and routed to the caller Process. This method may request additional services from other loosely coupled applications to complete its business task. These requests result in the creation of new Data Tokens, which are pushed and routed by the Databus.

Reactions inside a Process Context instance does Reaction pushes of Data Tokens to the Databus in the following ways:

By issuing one or more Databus call operations that request service from other Processes in the same or different Interaction context instance.

By returning or throwing an exception operations to the caller Processes.

By registering a timer, using the Databus register Reaction Timer operation.

By storing active data, using the Databus storeData operation.

When the timer expires, the Databus pushes a time-out exception Data Token, in the current Reaction context instance.

Reactions inside a Process context instance pull Data Tokens from the Databus in the following way: By registering one or more Reactions in the current Process Context instance using Databus registerReaction method.

One or more Reactions can exist for each Process. A base Reaction is used for the request and another for picking a response to support the asynchronous nature of a request/response interaction. Inside a Process, multiple service requests can be initiated. For every service request issued, there can be a Reaction for picking a response or alternatively there can be Reactions that pick composite responses. Additional Reactions can be registered in the Process to handle timer expiration Data Tokens, to support concurrent state machine schedules and sequencing between application methods.

Matching Reactions

FIG. 5 illustrates Reaction 508 in accordance with an embodiment of the present invention. Reaction 508 includes Reaction matching conditions 520. When Reaction matching conditions 520 are met, Reaction 508 pulls the input Data Tokens, executes and may push output Data Tokens: one or more requests to other applications and/or results to the caller Process. As illustrated in FIG. 5, input Data Tokens 502, 504, and 506 are applied to Reaction 508. When Reaction matching conditions 520 determine that input Data Tokens 502, 504, and 506 are available Reaction 508 executes. Note that input Data Tokens 502, 504, and 506 can arrive independently and may arrive over a long period of time.

When Reaction 508 executes, output Data Tokens 510, 512, 514, 516, and 518 are produced. These output Data Tokens are provided to the Databus and ultimately to another Reaction where the Data Tokens are consumed.

The Databus routing subsystem is responsible for making the different types of Data Tokens available at the specified destination, Process Context instance that is a union of {Interaction identifier and Process Activation identifier.} When Data Tokens are routed and become available in the Databus inside a Process Context instance, the Databus tries to match these Data Tokens with all registered Reaction(s) available in that context instance. The system tries to match the Data Token tags specified in a Reaction template, evaluating all constraint conditions against the matched Data Tokens to filter and discard the inappropriate ones.

Availability of some Data Token(s) does not mean that a registered Reaction will match immediately. It is only when all Data Tokens, required by a Reaction, become available that matching succeeds. For example, inside takeOrder Process the takeOrder base Reaction has registered the procPO Reaction that is the waiting for the checkCRED and checkINV Processes to respond. When checkINV Process responds to the takeOrder Process, procPO Reaction is not matched because it is also waiting for the checkCRED Process to respond. It is when the checkCRED Process responds to the takeOrder Process that the procPO Reaction is matched.

Additionally, Data Token(s) available in the Databus may be matched with a Reaction that will be registered in the future. This can be used for sequencing Processes, where the completion of one Process can enable another Process. Inside the same Interaction, the takeOrder Process must be completed before cancelOrder Process can start executing. If takeOrder Process has not completed but cancelOrder Process is requested from a client participant, its base Reaction, which is implicitly created by the system, will not be matched because it is waiting for the completion Data Token of the takeOrder Process to be available. If takeOrder Process has completed (thus already pushed its completion Data Token) and then cancelOrder Process is requested from a client participant, then it will be matched immediately because the completion Data Token of the takeOrder Process is already available.

Matching of Data Tokens with Reactions can trigger the activation of zero, one or more Reactions, which are executed in parallel if they don't conflict for shared database resources or Data Tokens.

Reactions interested in querying a Data Token are not conflicting with other querying Reactions. These Reactions can register query interest on the latest version of a Data Token or in previous versions of a Data Token.

Reactions interested in exclusively modifying a Data Token are not conflicting with other querying Reactions but are conflicting with other exclusively modifying Reactions. These Reactions can register modification interest only on the latest version of a Data Token.

Exclusive Reactions are checked for deadlock situations. When an exclusive Reaction is interested in more than one Data Tokens and other exclusive Reaction(s) are interested in the same Data Tokens but in different order then Reactions will deadlock if matched partially. The Databus matches a Reaction only if all available Data Tokens are available and can be obtained in the required access mode (shared mode for querying Reactions and exclusive mode for modifying Reactions). Otherwise the Reactions are not matched and the deadlock is prevented.

Scheduling a Matched Reaction for Execution

FIG. 6 is a flowchart illustrating the process of placing an entry in the scheduling queue in accordance with an embodiment of the present invention. The system starts when a physical Databus such as physical Databus 110 scans table 224 and any other tables associated with physical Databus 10 to find matching Data Tokens and Reactions (step 602). Next, physical Databus 110 determines if all Data Tokens are available for a particular Reaction (step 604). If so, physical Databus 110 places a scheduling entry in scheduling queue 222 (step 606). After placing the scheduling entry in step 606 or if all data is not available for a particular data request at step 606, the Process returns to step 602 to continue scanning the tables.

When the Data Tokens become available, and matched with a Reaction, the Databus verifies that the types (primitive or class types) of the Data Tokens matched on the tags also match the types of the Reaction's application method types. Then it verifies that the matched Reaction is authorized to pull the available matched Data Tokens. If everything passes successfully then it schedules the firing of the Reaction.

The execution process that will eventually invoke the application method can be different from the process that initiated the service request. In case where there are multiple execution processes in the Databus, load balancing is automatically achieved because any free execution process can fire the matched Reaction.

The Reaction firing phase can happen at a much later time of the Reaction matching phase. The Data Tokens that are matched by a Reaction are not visible to the Data Token garbage collection process for the period between matching and firing phases. Only when the Reaction commits/ rollbacks, the Data Tokens are visible to the Data Token garbage collection process. The Data Tokens are visible to other Reaction that have a query interest or a exclusive modification interest following the rules described earlier.

When the matched Reaction is fired, the Databus begins an atomicity, consistency, isolation, and durability (ACID) transaction and instantiates the requested application. Then the application method, of the fired Reaction, gets executed using the Reaction's matched Data Tokens. It is this time where the values of the matched Data Tokens are passed into the executing application method.

The Databus automatically commits the current Reaction at the end of every Reaction method. All the changes to its exclusively pulled Data Tokens and all its service request/ response Data Tokens sent to a recipient Process become available to other Reaction(s) interested in them. The versioning of the new values of modified Data Tokens described earlier happens at this stage. Also the enforcement of the single assignment and serialization rules happens at this stage.

A Reaction commit marks also the end of the ACID transaction, so that all its database changes or other participating resource manager's changes Data Token become committed.

The activation of a Reaction has exactly once semantics, if the Reaction commits. If a failure occurs after a commit, then the Reaction cannot be rolled backed and the changes will persist. If a failure occurs before or during a commit, then the container rollbacks the current Reaction.

A Reaction rollback removes all the changes to its exclusively pulled Data Tokens and the service requests/responses are never sent to a recipient Process. Additionally the ACID transaction is rolled back and so all the database changes or other participating resource manager's changes are also removed.

In case of failures, the firing of a Reaction will be retried by the Databus for a pre-configured number of attempts. The Reaction is marked as COMPLETED, with exception completion status, if the maximum retry attempts are reached.

The Databus Reaction garbage collection process is responsible for deleting Reactions, if their time-to-live has expired and they are not currently matched. When a Reaction is created it is in UNMATCHED state. When matching succeeds it enters the MATCHED state. When the Reaction commits it enters the COMPLETED state. When the Reaction rollbacks it enters the UNMATCHED state again if its retry count has not reached the maximum retry attempts.

The Databus Process garbage collection process is responsible for deleting Processes, if their time-to-live has expired and they are not currently containing one or more Reactions.

In traditional database machines, where the duration of a transaction is short, abnormal situations cause the whole transaction to be undone, so all performed work is lost and needs to be submitted again for execution. Since Interactions have usually long duration and contain a large number of Reaction(s), the Databus provides additional mechanisms to handling exceptions (such as hardware crashes and system software node crashes).

A Reaction is automatically persisted by the Databus, if it completes successfully. The state that is saved (Process input variable data, Process local variable data, and data flow context information) can be used to continue the application with minimum restart time from the last Reaction. When a node crashes, all Reactions that were running and did not end successfully are rolled back. Then the interrupted Reactions will be re-executed by another scheduling element.

Component Relationships

Figure 8:
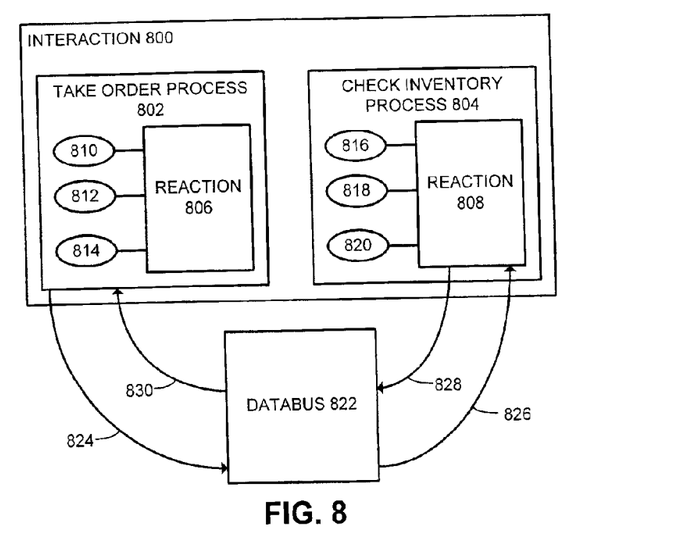
FIG. 8 illustrates the relationship of a Databus, Interactions, Processes, Data Tokens, and Reactions in accordance with an embodiment of the present invention.

FIG. 8 illustrates the relationship of a Databus, Interactions, Processes, Data Tokens, and Reactions in accordance with an embodiment of the present invention. Interaction 800 includes take order process 802 and check inventory process 804. Take order process 802 sends call 824 to Databus 822. Databus 822, in turn, forwards Data Token 826 to check inventory process 804. When all of Data Tokens 816, 818, and 820 are available, Reaction 808 fires returning Data 828 to Databus 822. Databus 822 sends Data Token 830 to take order process 802. When all of Data Tokens 810, 812, and 814 are available, Reaction 806 fires completing the transaction.

The Databus uses a mechanism to capture, propagate, and match the application state and data flow information needed for resuming an application after the crash. Additionally, because Reaction execution is data-driven there is no need for the system to keep a volatile or persistent copy of the entire program state (such as program execution stack) in order to facilitate the storage of the control flow descriptors or the storage of data variables.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate interaction management between loosely coupled applications, comprising:

receiving an at least one Data Token from an application at a Databus, wherein the Databus provides persistent storage, computation services, and scheduling services;

storing the at least one Data Token in a matching queue within the Databus;

creating a Data Token entry in an at least one data structure, wherein the Data Token entry specifies the at least one Data Token stored in the matching queue;

matching the Data Token entry with other available Data Token entries in the at least one data structure and with a service request in the at least one data structure, wherein the service request specifies Data Tokens required for a service; and when all Data Tokens required for the service are available, placing a scheduling entry in a scheduling queue to schedule the service;

whereby the method relieves the application from directly accessing the service and knowing an interface with the service.

2. The method of claim 1, further comprising:

receiving the at least one Data Token at the Databus; and routing the at least one Data Token to an additional Databus, wherein routing the at least one Data Token to the additional Databus is transparent to a creator of a message, and wherein the additional Databus provides the service.

3. The method of claim 1, wherein the Databus retries the scheduling entry until one of the service is provided and an exception is raised.

4. The method of claim 1, wherein the Databus ensures that the service is provided exactly once.

5. The method of claim 1, further comprising:
propagating security context; and
providing security credentials, wherein providing security credentials includes identity impersonation to receive the service.

6. The method of claim 1, wherein interaction management includes lifecycle management of computation context, computation context including active data and data flow routing information.

7. A computer-readable storage medium storing instructions that when executed by a computer cause the computer to perform a method to facilitate interaction management between loosely coupled applications, the method comprising:
receiving an at least one Data Token from an application at a Databus, wherein the Databus provides persistent storage, computation services, and scheduling services;
storing the at least one Data Token in a matching queue within the Databus;
creating a Data Token entry in an at least one data structure, wherein the Data Token entry specifies the at least one Data Token stored in the matching queue;
matching the Data Token entry with other available Data Token entries in the at least one data structure and with a Reaction in the at least one data structure, wherein the Reaction specifies Data Tokens required for a service; and
when all Data Tokens required for the Reaction are available, placing a scheduling entry in a scheduling queue to schedule the service;
whereby the method relieves the application from directly accessing the service and knowing an interface with the service.

8. The computer-readable storage medium of claim 7, the method further comprising:
receiving a data request;
storing the data request in the matching queue; and
creating a data request entry in the at least one data structure, wherein the data request entry specifies the data request stored in the matching queue.

9. The computer-readable storage medium of claim 7, the method further comprising:
receiving the at least one Data Token at the Databus; and
routing the at least one Data Token to an additional Databus, wherein routing the at least one Data Token to the additional Databus is transparent to a creator of a message, and wherein the additional Databus provides the service.

10. The computer-readable storage medium of claim 7, wherein the Databus retries the scheduling entry until one of the service is provided and an exception is raised.

11. The computer-readable storage medium of claim 7, wherein the Databus ensures that the service is provided exactly once.

12. The computer-readable storage medium of claim 7, the method further comprising:
propagating security context; and
providing security credentials, wherein providing security credentials includes identity impersonation to receive the service.

13. The computer-readable storage medium of claim 7, wherein interaction management includes lifecycle management of computation context, computation context including active data and data flow routing information.

14. An apparatus to facilitate interaction management between loosely coupled applications, comprising:
a receiving mechanism that is configured to receive an at least one Data Token from an application at a Databus, wherein the Databus provides persistent storage, computation services, and scheduling services;
a storing mechanism that is configured to store the at least one Data Token in a matching queue within the Databus;
a creating mechanism that is configured to create a Data Token entry in an at least one data structure, wherein the Data Token entry specifies the at least one Data Token stored in the matching queue;
a matching mechanism that is configured to match the Data Token entry with other available Data Token entries in the at least one data structure and with a data request in the at least one data structure, wherein the data request specifies Data Tokens required for a service; and
a schedule entry mechanism that is configured to schedule the service in a scheduling queue;
whereby the application is relieved from directly accessing the service and knowing an interface with the service.

15. The apparatus of claim 14, wherein:
the receiving mechanism is further configured to receive the data request;
the storing mechanism is further configured to store the data request in the matching queue; and
the creating mechanism is further configured to create a data request entry in the at least one data structure, wherein the data request entry specifies the data request stored in the matching queue.

16. The apparatus of claim 14, wherein the receiving mechanism is further configured to receive a message including the at least one Data Token at the Databus, the apparatus further comprising a routing mechanism that is configured to route the message to an additional Databus, wherein routing the message to the additional Databus is transparent to a creator of the message, and wherein the additional Databus provides the service.

17. The apparatus of claim 14, further comprising a retry mechanism that is configured to retry a scheduling entry until one of the service is provided and an exception is raised.

18. The apparatus of claim 14, further comprising a service providing mechanism that is configured to ensure that the service is provided exactly once.

19. The apparatus of claim 14, further comprising:
a propagating mechanism that is configured to propagate security context; and
a providing mechanism that is configured to provide security credentials, wherein providing security credentials includes identity impersonation to receive the service.

20. The apparatus of claim 14, wherein interaction management includes lifecycle management of computation context, computation context including active data and dataflow routing.

21. A system to facilitate interaction management between loosely coupled applications, comprising:
a process means for representing a business task; and
a reaction means for performing the business task;

wherein the process means and the reaction means provide request and response processing.

22. The system of claim 21, further comprising exception means for raising an exception when an error is detected.

23. The system of claim 21, further comprising persistence means to provide persistence to the process means during temporary system failures.

24. The system of claim 21, further comprising restartability means to restart an interrupted process.

25. The system of claim 21, further comprising:
 push means to push Data Tokens onto a databus; and
 pull means to pull Data Tokens from the databus.

* * * * *